F. M. WOODS.
Gaveling-Tongs.

No. 215,707.    Patented May 20, 1879.

Witnesses:
J. W. Garner
W. S. D. Haines

Inventor:
F. M. Woods,
per
F. A. Lehmann,
atty.

3 Sheets—Sheet 2.

F. M. WOODS.
Gaveling-Tongs.

No. 215,707. Patented May 20, 1879.

Witnesses:
J. W. Garner
W. S. D. Haines

Inventor:
F. M. Woods
per
F. A. Lehmann
atty.

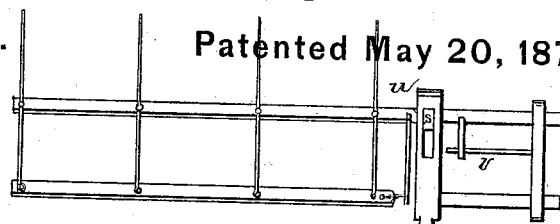
F. M. WOODS.
Gaveling-Tongs.
No. 215,707. Patented May 20, 1879.
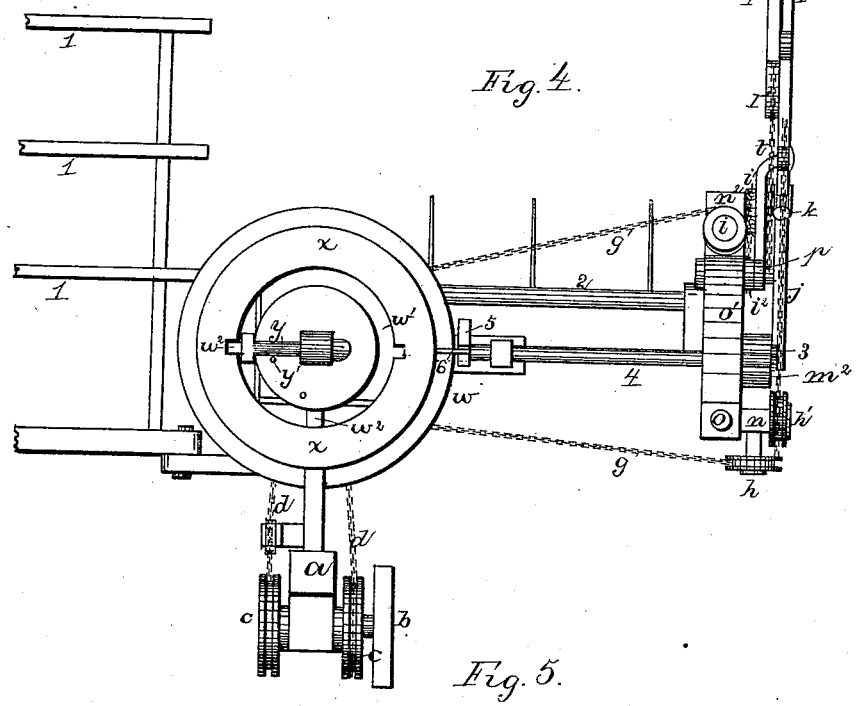
Fig. 4.
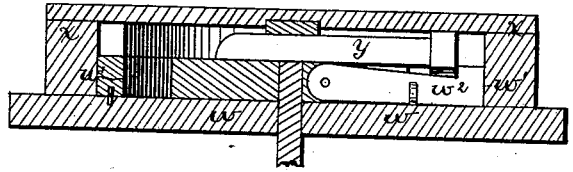
Fig. 5.
Fig. 6.
Witnesses:
J. W. Garner
W. S. D. Haines
Inventor:
F. M. Woods,
per
F. A. Lehmann,
Atty

UNITED STATES PATENT OFFICE.

FRANK M. WOODS, OF YORK, ILLINOIS, ASSIGNOR OF ONE-HALF HIS RIGHT TO WM. P. JONES, G. N. PARKER, AND JACOB OLWIN, OF SAME PLACE.

IMPROVEMENT IN GAVELING-TONGS.

Specification forming part of Letters Patent No. 215,707, dated May 20, 1879; application filed April 3, 1879.

*To all whom it may concern:*

Be it known that I, FRANK M. WOODS, of York, in the county of Clark and State of Illinois, have invented certain new and useful Improvements in Gaveling-Tongs; and I do hereby declare the following to be a full, clear, and exact description of the invention, such as will enable others skilled in the art to which it pertains to make and use it, reference being had to the accompanying drawings, which form part of this specification.

My invention relates to an improvement in gaveling-tongs; and it consists in the arrangement and combination of parts, whereby the driver by a movement of his foot first extends the rake and then swings it horizontally around over the platform outside of the cut grain, draws the grain back to the stationary part of the rake, and then the two parts of the rake, carrying the gavel between them, are swung around, so as to drop the gavel on the ground behind the machine, as will be more fully described hereinafter.

Figure 1:
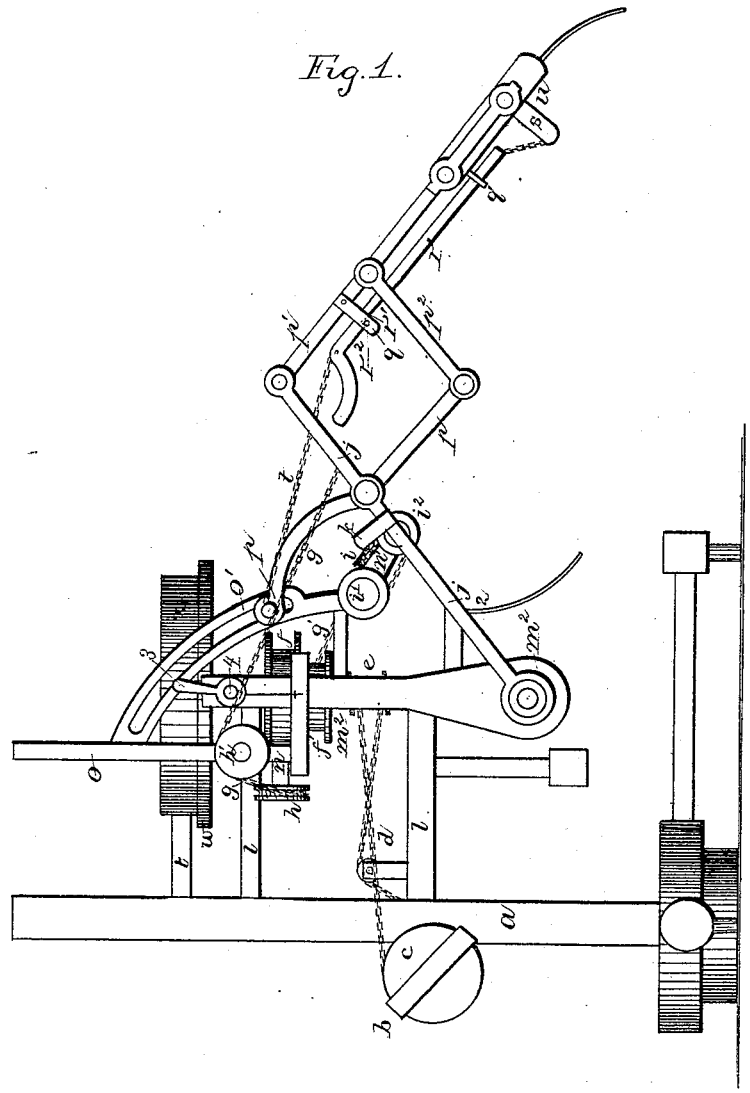
Figure 2:
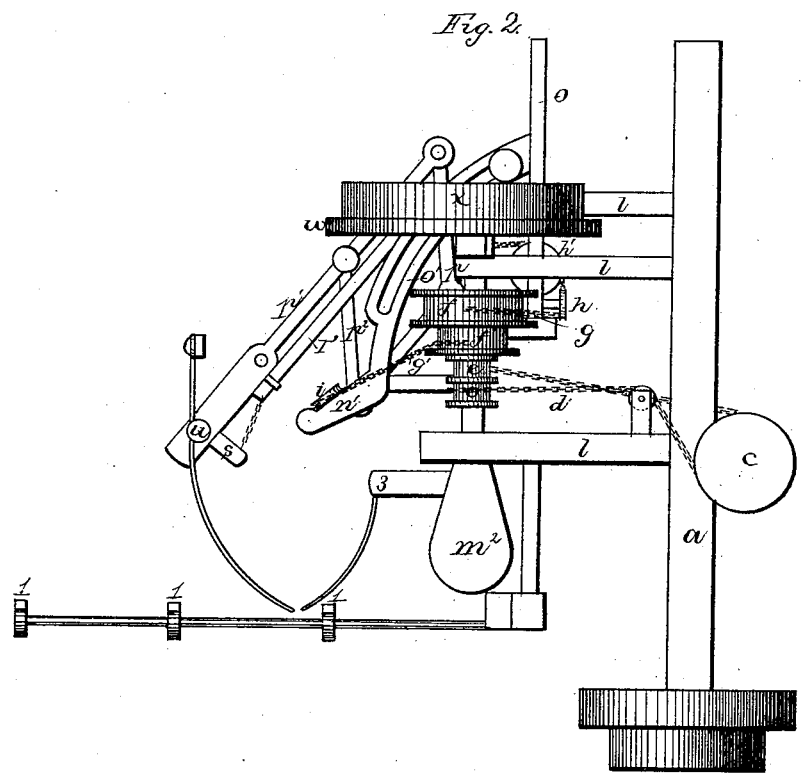
Figure 3:
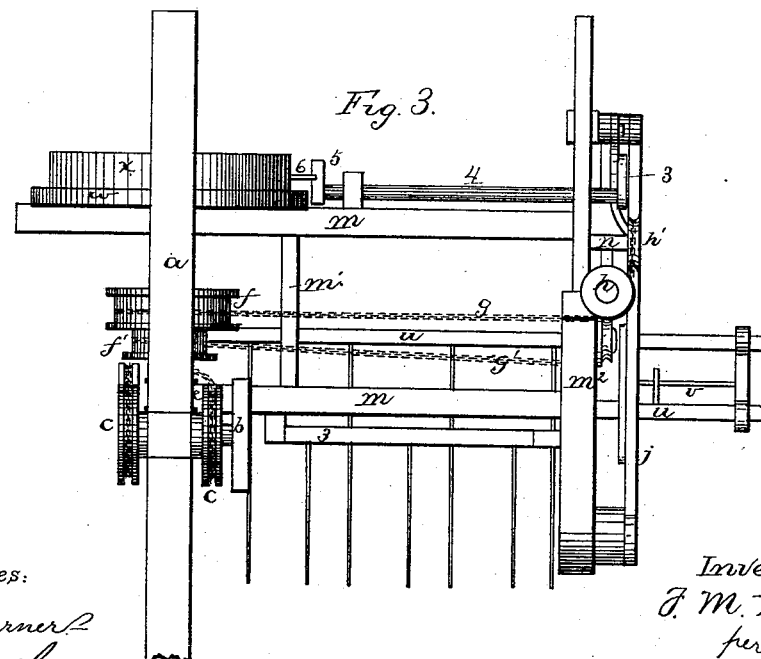

Figures 1 and 2 are side elevations of my invention, taken from opposite sides. Fig. 3 is a front elevation, and Fig. 4 a plan view, of the same. Figs. 5, 6 are detail views.

$a$ represents a suitable standard, which is bolted to the rear part of the reaper-body, and which supports the working parts of my invention. Down on the body of the frame, at a suitable distance in front of the standard, is a short shaft, having the treadle $b$ and the two grooved pulleys $c$ rigidly secured thereto. To each of these pulleys is fastened a small chain, $d$, which pass around the pulleys in opposite directions, and which chains pass backward around the small drum $e$, around which they are wrapped in opposite directions. The driver by pressing upon the upper end of the treadle causes the drum $e$ to turn to the left and extend the movable portion of the rake, and by pressing upon the lower end turns the drum to the right and closes up the rake, as will be more fully described hereinafter.

Forming a part of the same shaft as the drum $e$ are the two drums $f\ f'$, of which the upper one is the largest, and around which drums pass the two chains $g\ g'$ in opposite directions. The upper chain, $g$, passes outward under the pulley $h$, up over the one, $h'$, and is fastened to the long lever $j$ near its upper end. The lower chain, $g'$, fastened to the smaller drum, $f'$, passes outward around the pulleys $i$ $i^1\ i^2$, and is fastened to the arm $k$ on the lever $j$, as shown, at a suitable distance below where the chain $g$ is fastened.

Secured to the standard $a$ are a suitable number of supporting-rods, $l$, two of which form the journals of the shaft on which the drums $e\ f\ f'$ are formed, and on this drum-shaft are secured the two swinging arms $m$, which are connected together and braced by the post $m^1$ and by the head $m^2$ at their outer ends. From this head $m^2$ projects the supporting-arm $n$, upon which the pulleys $h\ h'$ are placed, and the one, $n'$, for the pulleys $i\ i^1\ i^2$. From the top of the arm $n$ extends the standard $o$, and from the rear side of this standard extends the curved slotted guide $o'$, which has its lower rear end fastened to the arm $n'$. In this slotted guide catches the upper end of the rod $p$, which is pivoted upon the long lever $j$, which lever $j$ is pivoted at its lower end to the head $m^2$, and extends up above the slotted guide. To the upper end of this lever is pivoted the long rod $p^1$, which is connected to the lower end of the rod $p$ by the rod $p^2$. The lever $j$ and rods $p\ p^1\ p^2$ form a lazy-tong movement, by which the movable part of the rake can be extended and retracted at the will of the driver by pressure on the treadle $b$, as described.

Held in suitable guides $q\ q'$ on the under side of the rod $p^1$ is the sliding rod $r$, which has a notch, $r^1$, near its upper end, to catch over a catch, $r^2$, in the guide $q$ when the rod is drawn upward, and which rod is connected to the lever $s$ on the rake-head at its lower end by a short chain. This rod $r$ only has its notch drawn over the catch when the rod has moved outward to the full length of the chain $t$, by which it is fastened at its upper end to the upper end of the rod $p$, and the rod $p$ still continues to move the rake outward. As soon as the rod $r$ is thus held against further outward movement the continued outward movement of the rod $p^1$ causes a pull on the lever $s$, which is fastened to the rake-head $u$, journaled in the lower end of the rod $p^1$, and this lever causes the rake to turn the teeth downward ready to draw the cut grain across the top of the platform, and the teeth are thus held as long as the rod is held stationary by the catch. As soon, however, as the rod is released a suitable spring, $v$, at once causes the rake-head to turn in its bearing, and throw the lower ends of the teeth outward.

Upon the top of the arm $m$, and pivoted on the drum-shaft, is the revolving disk $w$, which has a groove, $w^1$, running around its face, and which is provided with the two spring-catches $w^2$ for locking it in position until it is desired that it shall turn with the drum-shaft, and thus swing the whole rake around, so as to bring it over the edge of the platform, to which the cutter-bar is attached. The cover $x$ over the top of this disk $w$ is stationary, and in this cover the catches hold until the rotary lever $y$ on the upper end of the drum-shaft sweeps around and depresses them, thus leaving the disk free to turn. This lever $y$ turns about three-fourths around without moving the disk at all, during which movement the chain $g'$ extends the movable part of the rake to its full extent, and then the shorter end of the lever $y$ strikes against a stop, $y'$, on the top of the disk and turns the disk with it. After the rake-head $u$ is swung around over the cutter-bar the driver presses with his heel upon the lower end of the treadle, when the chain $g$ is brought into play and draws the rake-head and all its attachments directly across the platform toward the stationary part of the rake in the form of a gavel. Upon the top of the platform are placed a number of bars, 1, so as to hold the grain slightly above its surface, and thus enable the lower end of the rake-teeth to get under it.

The stationary part 2 of the rake is pivoted between arms which project out from the lower arm, $m$, and the head $m^2$, and though it is carried around with the other parts of the machine, it has no movement of its own except to have the lower ends of its rake-teeth drop downward when it is desired to drop the gavel.

The movable part of the rake having swept the gavel up to the teeth of the stationary part 2, it is securely held between the two parts while the whole machine swings around, when the gavel is dropped upon the ground in the rear of the machine.

As the rake-head is being drawn inward across the platform, the upper end of the rod $r$ is struck by an arm, 3, on the outer end of the shaft 4, so as to raise the rod $r$ free from its catch, and thus let the rake-head $u$ spring outward to release the gavel. On the inner end of this shaft 4 is an arm, 5, which comes in contact with the projection 6 on the side of the cover $x$, and thus causes the shaft to turn partially around and operate the arm 3.

Having thus described my invention, I claim—

1. The combination of the treadle $b$, pulleys $c$, chains $d$, drums $e$ $f$ $f'$, chains $g$ $g'$, and a mechanism, substantially as described, for moving the rake-head $u$ outward, substantially as shown.

2. The combination of the treadle $b$, pulleys $c$, chains $d$, drum-shaft to which the said chains are fastened, revolving disk $w$, having the spring-catches $w^2$, cover $x$, and rotary lever $y$, whereby the rake-head $u$ is made to swing around by the arms $m$ and the drum-shaft, substantially as set forth.

3. The combination of the chains $g$ $g'$ and a suitable operating mechanism with the levers $j$ $p$ $p^1$ $p^2$, rod $r$, chain $t$, curved guide $o'$, lever $s$, and the rake-head, substantially as specified.

4. The rod $r$, provided with the catch $r^1$ and extension on its upper end, in combination with the arm 3, shaft 4, and revolving disk, provided with the projection for moving the shaft, whereby the rake-head is released and made to spring back, so as to release the gavel, substantially as shown.

In testimony that I claim the foregoing I have hereunto set my hand this 26th day of March, 1879.

FRANK M. WOODS.

Witnesses:
W. S. D. HAINES,
F. A. LEHMANN.